(12) United States Patent
Suzuki et al.

(10) Patent No.: US 6,615,232 B2
(45) Date of Patent: Sep. 2, 2003

(54) MOBILE AGENT AND METHOD FOR PROVIDING IDENTIFYING INFORMATION TO MOBILE AGENTS AND SUBSEQUENT GENERATION AGENTS

(75) Inventors: Toshihiro Suzuki, Yokohama (JP); Kazuhiro Minami, Yokohama (JP)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,477

(22) Filed: Mar. 11, 1999

(65) Prior Publication Data

US 2003/0084090 A1 May 1, 2003

(30) Foreign Application Priority Data

Mar. 13, 1998 (JP) .......................................... 10-062420

(51) Int. Cl.[7] ................................................ G06F 15/14
(52) U.S. Cl. ........................ 709/202; 709/252; 709/317
(58) Field of Search ................................ 709/202, 315, 709/317, 100, 252; 706/10

(56) References Cited

U.S. PATENT DOCUMENTS

| 5,619,615 A | * | 4/1997 | Pitchaikani et al. | .......... 706/10 |
| 6,016,393 A | * | 1/2000 | White et al. | ................ 709/315 |
| 6,243,480 B1 | * | 6/2001 | Zhao et al. | ................. 382/100 |

OTHER PUBLICATIONS

H.Peine: "An Introduction to Mobile Agent Programming and the Ara System", ZRI–REPORT 1/97, pp 1–67.

* cited by examiner

*Primary Examiner*—Frantz B. Jean
(74) *Attorney, Agent, or Firm*—Gail H. Zarick; Anne V. Dougherty

(57) ABSTRACT

A mobile agent is provided with ancestor gene information and self gene information. The self gene information is encrypted information which indicates how many generations the mobile agent is descendant from the original agent. When the mobile agent creates a clone (creates a child agent), it generates gene information of its self generation+1 and implants it in the child agent. The mobile agent moving on the network and encountering another mobile agent on a same place obtains gene information from that agent, converts the obtained gene information by a predetermined algorithm, and determines if the agents are descended from the same ancestor.

7 Claims, 6 Drawing Sheets

MOBILE AGENT AND METHOD FOR PROVIDING IDENTIFYING INFORMATION TO MOBILE AGENTS AND SUBSEQUENT GENERATION AGENTS

FIELD OF THE INVENTION

This invention relates to a mobile agent technology to move a mobile agent to a remote server on a network and to generate an instruction on the remote server in a distributed computer environment and, particularly, to a method of moving a mobile agent to a remote server and identifying other mobile agents with which it communicates.

BACKGROUND OF THE INVENTION

There has been in the prior art a mobile agent technology to move a mobile agent to a remote server on a network to generate an instruction on the remote server in a distributed computer environment (see: e.g., U.S. Pat. No. 5,603,031 and PUPA 7-509799 (International Application Number PCT/US94/07397, International Publication Number:WO97/02219), "Latest Internet Technology", Nikkei Communication Separate Edition, Nikkei BP Co., pp 104–117, by Fumihiko Nishida, Susumu Fujiwara, et al).

Such a mobile agent comprises two basic elements which are "mobile agent" and "place". The mobile agent can move around places existing on the network while maintaining its internal state. The mobile agent can contact another agent (a mobile agent or a non-mobile agent) in a place to receive a necessary service. The "place" is a place provided by a server existing on the network to which the agent moves and which supports a contact between agents and absorbs the difference between hardwares and between platforms.

Such mobile agent technology enables a mobile agent to execute jobs which have, so far, been done by a human being, such as adjusting the setting of an internal conference depending on a schedule of employees or a reservation status of a conference room or obtaining desired information distributed on the network.

There is a technology of classifying complex behavior of a mobile agent into basic behavior patterns, providing a template (moderator template) which enables a desired behavior pattern of the mobile agent to be defined, and controlling an activity of issuing a request in each place around which the mobile agent wanders as a predecessor (an activity working in a previous place) and a successor (an activity working in the next place), as disclosed in Japanese patent application 9-92091 filed by the applicant of this application on Apr. 10, 1997 though not laid open at the time when the priority application for this invention was filed.

With this technology, a problem can be solved relying on the cooperativity of the mobile agent not only by moving the agent but also causing it to split itself and/or consolidating its split components. In this technology, however, the model is applied only to a predetermined cooperative algorithm (plan) and the technology has been limited thus far by not being able to provide a flexible cooperative problem-solving technique which allows a pre-defined cooperative algorithm to be reassembled or newly added.

This limitation is due to the fact that the mobile agent has no function to identify itself or to identify a clone created from itself (children, grandchildren, sibling, cousin, uncle and aunt, etc). As a result, the mobile agents cannot recognize and identify each other by an ID which is an index of the split and consolidation of a mobile agent.

A simple self corroboration may be feasible by corroborating the identity by an ID in the form of simple numerals. However, the foregoing may lead to a problem from a security viewpoint in that data may be replaced with malicious data if the ID can be found by anybody.

It is, therefore, an object of this invention to provide a mechanism for allowing a mobile agent to identify its ancestor, children, grandchildren and sibling, etc., by implanting gene information in a mobile agent.

It is another object of this invention to provide highly secured gene information which cannot be understood by a third party.

It is a further object of this invention to provide a mobile agent which can flexibly modify a job to be executed during movement.

Still another object of this invention is to shorten the processing time required from the time when the mobile agent is released to the time when the result is returned.

SUMMARY OF THE INVENTION

A mobile agent is provided with ancestor gene information and self gene information. The self gene information is encrypted information indicating the number of generations that the agent is removed from the original agent. When a mobile agent creates a clone (a child agent), it creates gene information of its generation+1 and implants it in the child agent. A mobile agent moving on the network and encountering another agent can obtain gene information of the latter agent and perform a conversion to affirm that they are created from a same ancestor.

This invention provides, in one aspect thereof, a mobile agent, which contacts another mobile agent in a place on a network, comprising: self gene information which is capable of deriving ancestor gene information and generation information by a predetermined conversion logic, a gene conversion module for generating child agent gene information which can derive said ancestor gene information and said generation information by a predetermined conversion logic, said child agent gene information being implanted in said child agent upon creation of the child agent by said mobile agent, and a gene comparison module for determining whether or not the result of the conversion of the gene information obtained from another agent corresponds to said ancestor gene information.

This invention provides, in another aspect thereof, an object held by a mobile agent, which agent contacts another mobile agent in a place on a network, comprising; self gene information which is capable of deriving ancestor gene information and generation information by a predetermined conversion logic, a gene conversion module for generating child agent gene information which can derive said ancestor gene information and said generation information by a predetermined conversion logic, said child agent gene information being implanted in said child agent upon creation of the child agent by said mobile agent, and a gene comparison module for determining whether or not the result of the conversion of the gene information obtained from another agent corresponds to said ancestor gene information.

This invention provides, in further aspect thereof, a method for creating a child agent based on a mobile agent existing in a place on a network, the method comprising; a step of deriving generation information of said mobile agent based on self gene information and ancestor gene information, a step of generating gene information of child agent based on said derived generation information and said ancestor gene information, and a step of generating a child agent which contains the generated gene information of the child agent and said ancestor gene information.

This invention provides, in a further aspect thereof, a method for allowing a mobile agent existing in a place on a network to identify the kind of another mobile agent existing in the same place, the method comprising; a step of obtaining gene information from said another mobile agent, a step of converting said obtained gene information by a predetermined logic, and a step of determining whether or not the result of the conversion corresponds to said ancestor gene information held in said mobile agent.

BRIEF DESCRIPTION OF THE DRAWINGS

The invention will now be described in greater detail with specific reference to the appended drawings in which.

DESCRIPTION OF THE EMBODIMENT

A. Environment and Terms Relating to the Invention

Figure 1:
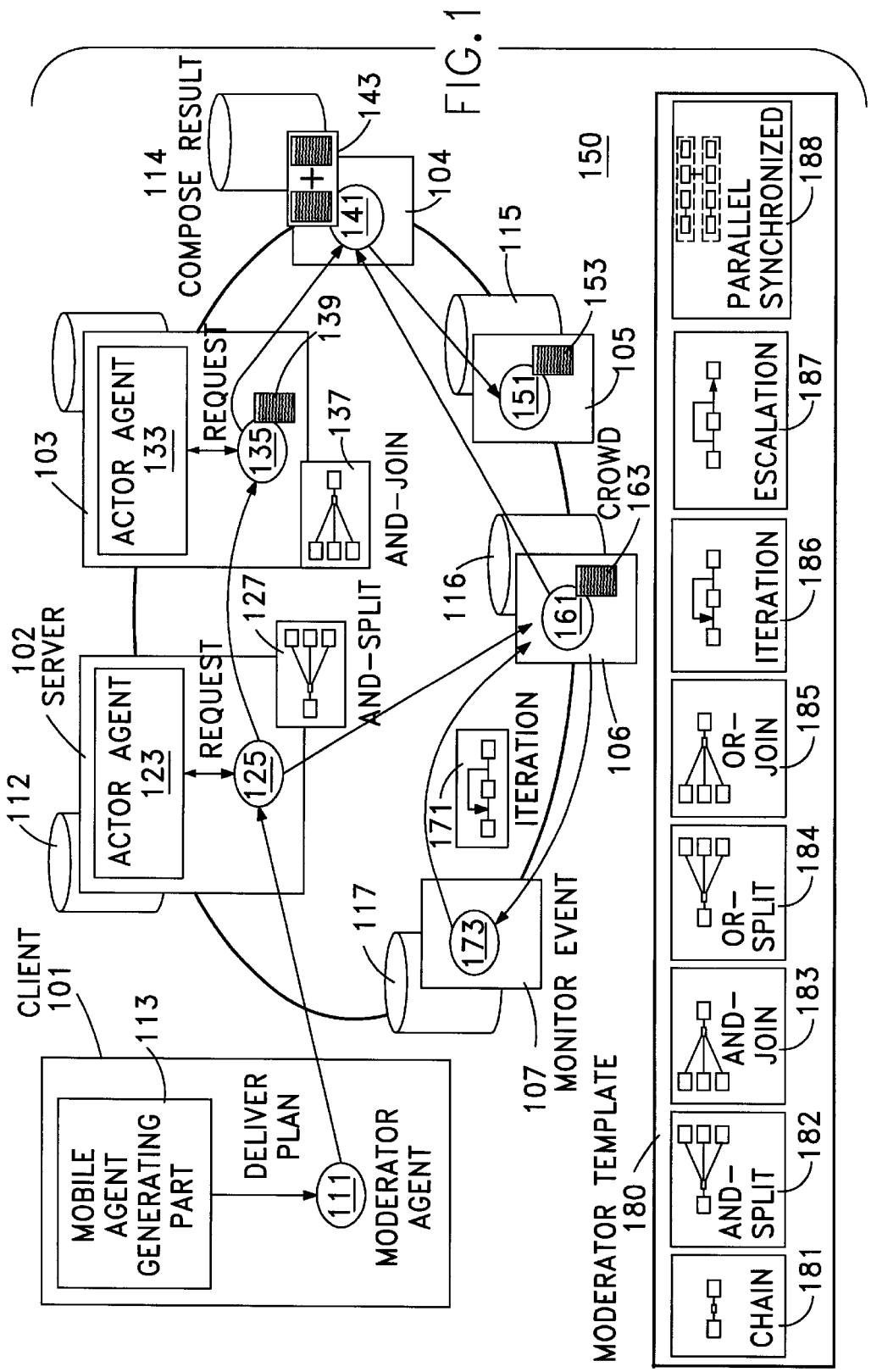
FIG. 1 shows a distributed network environment where a mobile object created in accordance with this invention operates.

An embodiment of this invention is now described hereunder with reference to the drawings. FIG. 1 shows a distributed network environment 150 executing a mobile object which is generated in accordance with this invention. Each server 112–117 is provided with a place 102–107 where a service can be provided to mobile agents 125, 135, 141, etc. The places in the distributed network environment are called a "crowd".

A mobile agent generating part 113 for generating a mobile agent exists in a client system 101. The mobile agent generating part 113 delivers a generated plan to a mobile agent 111 which, in turn, can move through a designated place by executing the plan. The mobile agent 125, etc., can communicate with another agent (an agent contacting to a mobile agent to provide a service is specifically called an "actor agent") existing in each place 102–107, can send out a request, and can receive the result of the request. The place supports a communication between agents. Also, the mobile agent 125, etc., can hold the result of the request received from an actor agent as Result 139, 143, 153, 163, and can continue to move and apply various works on the Result, such as composition and split, during movement.

Figure 2:
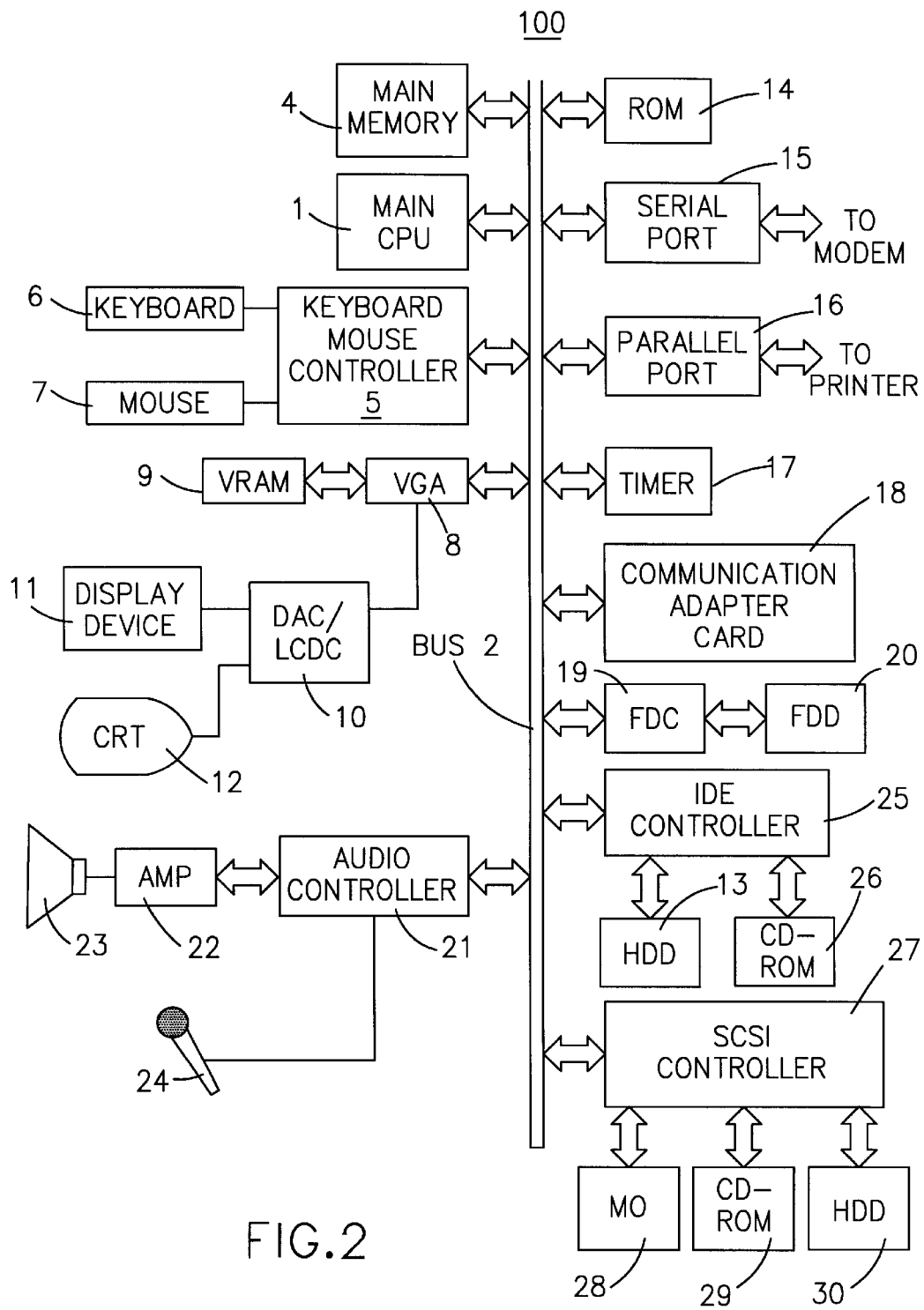
FIG. 2 shows a schematic diagram of a hardware configuration of node systems in a preferred embodiment of this invention.

In the preferred embodiment of this invention, movement, split and extinguishment of a mobile agent are controlled by moderator templates 181–187 and a user can simply define a complicated work, including split and merge as shown in FIG. 2, by combining various templates as required by the mode of processing.

As used herein, the term "a predetermined conversion logic" is a concept including not only inverting a given bit string but also decoding encrypted information and decompressing compressed information, etc. The term "generation information" is a concept including not only information indicating how many generations removed a descendant is from a specific ancestor but also information indicating that one generation is more descendant than another certain generation, or information discriminating a descendant from another descendant with respect to a certain ancestor among ancestors (a head family or a branch family, a descendant of a specific sibling, etc.).

B. Hardware Configuration

FIG. 2 shows a schematic diagram of a hardware configuration of node systems in a preferred embodiment of this invention. The node system 100 comprises a central processing unit (CPU) 1 and a memory 4. The CPU 1 and the memory 4 are connected to a hard disk device 13, 31 as an auxiliary storage via a bus 2, etc. A floppy disk device 20 (or a medium drive device such as an MO, a CD-ROM, etc. 13, 26, 28, 29, 30) is connected to the bus 2 through a floppy disk controller 19 (or a controller such as an IDE controller 25, a SCSI controller 27).

A floppy disk (or a medium such as an MO, a CD-ROM, etc.) is inserted to the floppy disk device 20 (or to a medium drive device such as an MO, a CD-ROM, etc. 26, 28, 29). A computer program code which gives instructions to the CPU and the like in cooperation with an operating system to practice this invention may be recorded in the floppy disk or a recording medium of the hard disk device 13, 30 and a ROM 14, and executed by being loaded in the memory 4. The computer program code may be compressed or divided into pieces for recording in a plurality of media.

Further, the node system 100 may be a system which is provided a with a user interface hardware including a pointing device 7 (a mouse, a joystick and a track ball, etc.) for inputting screen position information, a keyboard 6 for supporting a key input, and a display 11, 12 for presenting image data to the user. A speaker 23 receives an audio signal from an audio controller 21 via an amplifier 22 for output as voice.

A GUI plan node library (to be described later), which is an input to the node system 100 of this invention, is stored in a storage medium such as the floppy disk 24 and the hard disk 30 and inputted to the system via the SCSI interface 27. The GUI plan node library, which is an input, may be stored in a database of another system. In such case, it is possible to communicate with other computers, etc., to obtain access to a database of another system for obtaining the GUI plan node library via a serial port 15 and a modem or a communication adapter 18, such as a token ring.

As such, it will be readily understood that this invention may be implemented by a conventional personal computer (PC), a workstation, a computer implemented in home electric appliances such as a television set and a facsimile equipment, and/or a combination thereof. It should be noted, however, that these components are given for exemplary purposes and it is not meant that all of these components are indispensable components of this invention. Specifically, because this invention is directed to generation of a mobile agent, those components, including the serial port 15, the communication adapter card 18, the audio controller 21, the amplifier 22 and the speaker 23, are not indispensable to implementation of this invention.

As an operating system, those which support a GUI multi-window environment in default, such as Windows (trademark of Microsoft), OS/2 (trademark of IBM), X-WINDOW System (trademark of MIT) on AIX (trademark of IBM), are desirable. However, it is to be understood that the operating system is not limited to any specific operating system environment.

While FIG. 2 shows a system in a stand-alone environment, this invention may alteratively be implemented in a client/server system in which a client machine is LAN-connected to a server machine via Ethernet and a token ring, etc. and the server machine side is provided with a plan split part, etc., to be described later with the rest of functions disposed in the client side. As such, it is a matter of discretion in the design to dispose what function in which of the server machine side and the client machine side. Various modifications of a combination of a plurality of machines, distribution of functions to these machines, etc., and implementation thereof are within the concept of this invention.

C. Processing Components in the System

Figure 3:
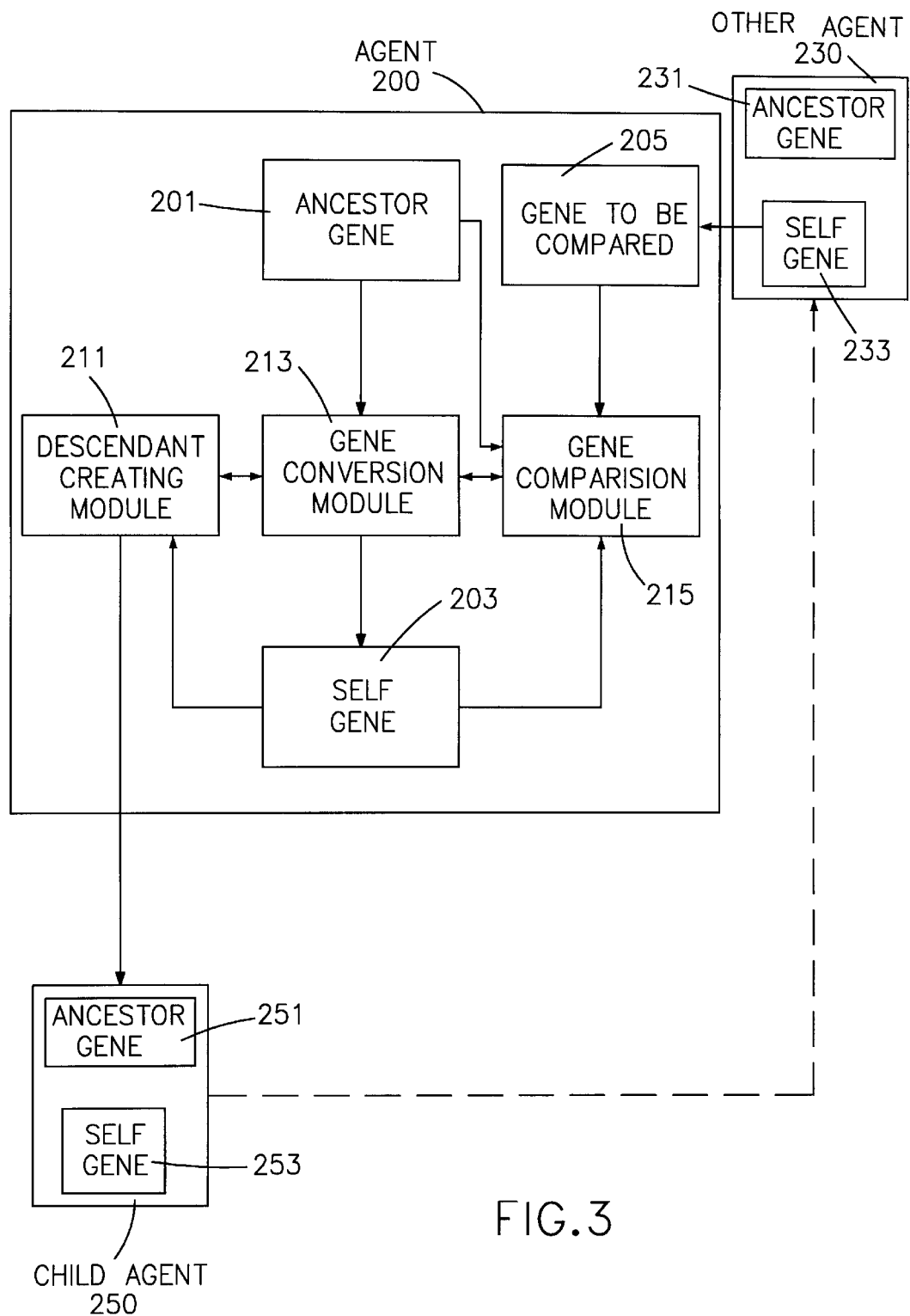
FIG. 3 is a functional block diagram showing an embodiment of processing components in the node system.

FIG. 3 is a block diagram showing an embodiment of processing components in the node system 100. The agent 200 holds an ancestor gene 201 and a self gene 203 and obtains a gene 205 from another agent for comparison. The agent 200 is also provided with a child creating module 211, a gene conversion module 213 and a gene comparison module 215. The agent 200 is also provided with an interface to exchange the self gene with other agents.

The ancestor gene 201 is information to specify the ancestor of the agent (i.e., the original agent). In the preferred embodiment of this invention, this information is protected from being externally notified or modified itself.

The self gene 203 is information to specify that the agent itself is a given number of generations descending from the ancestor. The gene 205 for comparison is information of the self gene 233 of a different agent 230 obtained from that different agent 230.

The child creating module 211 is a module for creating a descendant. The child creating module 211 implants a child gene 253 generated by converting the self gene 203 in the created child agent 250. The ancestor gene 201 is also implanted in the child agent 250.

The gene conversion module 213 converts a gene, which is a character string, to another gene in response to a request from the child creating module 211 and the gene comparison module. This is a conversion which can be reverse converted. The gene comparison module 215 can identify how many generations the gene is descended from the original agent by repeating reverse conversions of that gene.

The gene comparison module 215 can determine whether or not a gene 205 obtained from another agent is an agent which has a common ancestor and how many generations it is descendant therefrom by obtaining the gene 205 from another agent and repeating reverse conversion of that gene.

D. Object Configuration

Figure 4:
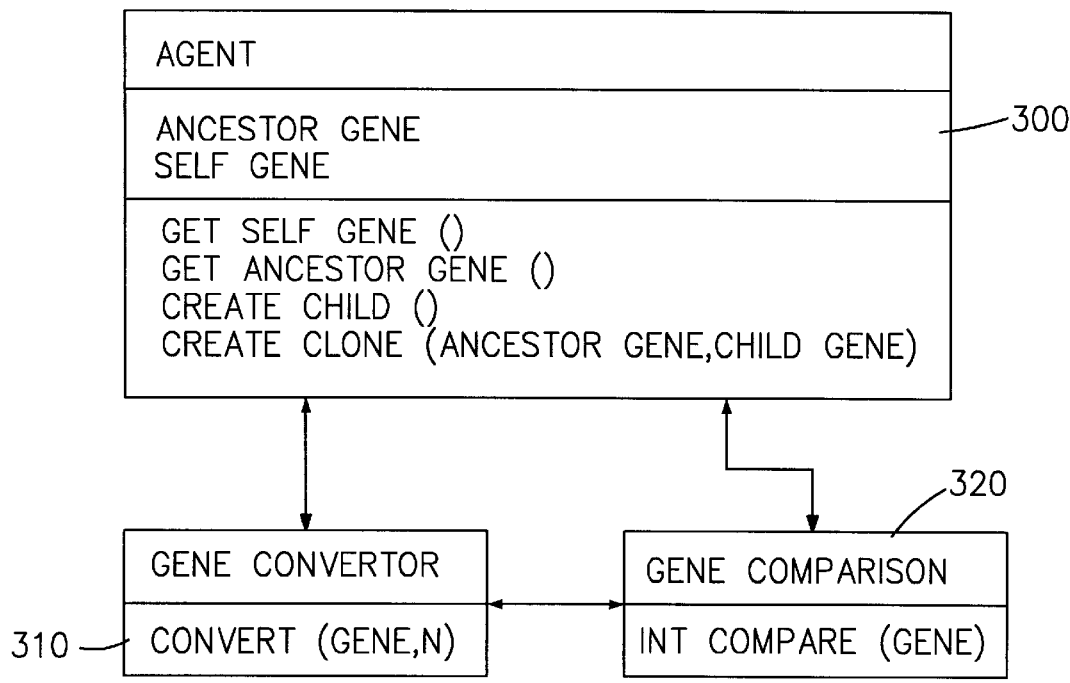
FIG. 4 is an object diagram of the mobile agent created in a preferred embodiment of this invention.

FIG. 4 is an object diagram of the mobile agent of this invention. The class of the agent class 300 has data and a method. Each class of a gene converter class 310 and a gene comparison class 320 has a method.

In the preferred embodiment of this invention, the agent class 300 has data of ancestor gene information 201 (ancestorGene) and self gene information 203 (selfGene), along with methods including "get ancestorGene" and "get selfGene" to obtain ancestor gene information 201 and self gene information 203.

A "create child" method is a method for creating a child agent while a "create clone" method is a method for creating a clone of itself. A "create clone" method has an ancestor gene (ancestorGene) and a self gene of a child agent (childGene) as an argument.

The gene converter class 310 has a "convertGene" method for converting gene information in accordance with the generation. The "convertGene" method has converted gene information (gene) and generation information (n) as arguments. The gene comparison class 320 has a "compareGene" method for comparing gene information. The "compareGene" method has gene information (gene) as an argument.

E. Creation of Child Agent

Figure 5:
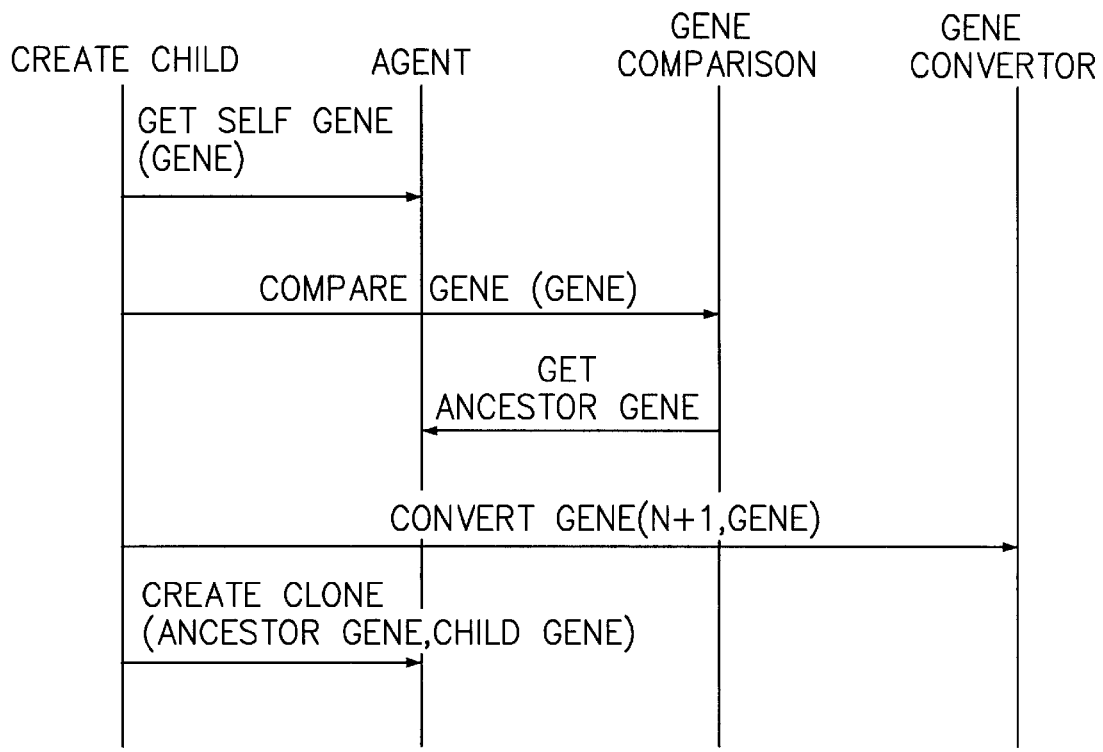
FIG. 5 is a diagram showing a message flow between objects in the preferred embodiment of this invention.

FIG. 5 is a diagram showing a major message flow of each class upon creating a child agent in the preferred embodiment of this invention. When the "createChild" method is called upon for creating a child agent, a self gene is first obtained from the agent. Next, the gene comparison class 320 is invoked to determine how many generations the agent is descendant.

The ancestor gene 201 is then obtained and the gene converter class 310 is asked to generate the gene 253 of the child agent 250. The argument then is generation information of its generation+1 and ancestor gene information. When the gene 253 of the child agent 250 is delivered from the gene converter class 310, a clone is created (create a copy of the agent's own) using the gene 253 and the ancestor gene information as arguments. The child agent 250 is thus created.

Figure 6:
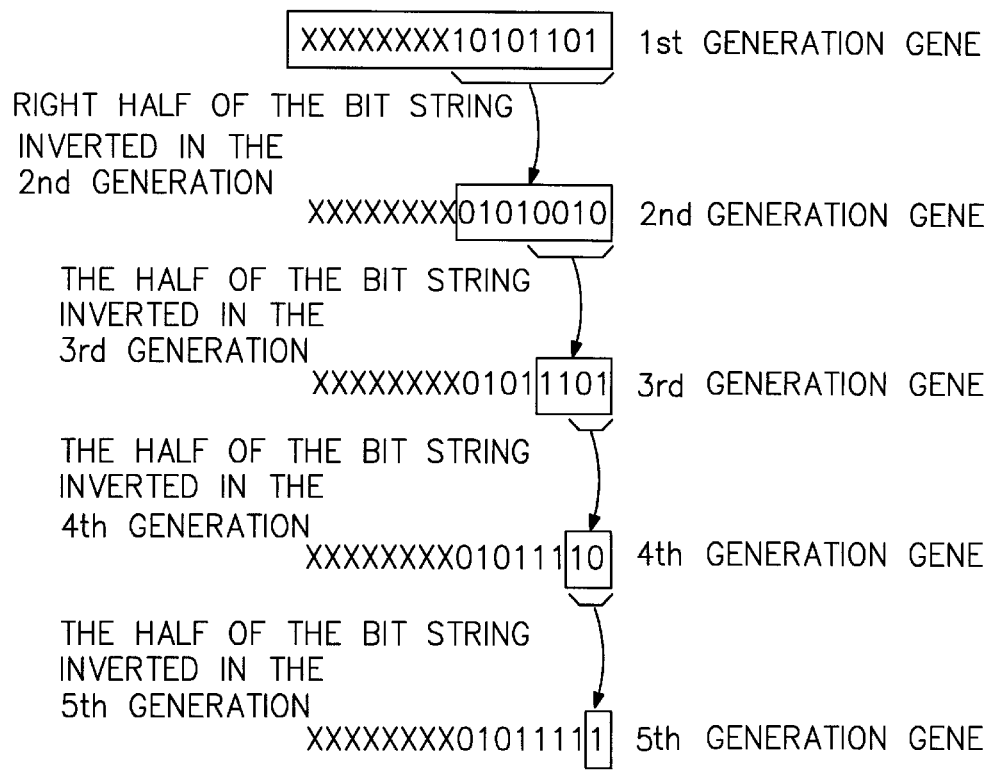
FIG. 6 is a diagram showing an example of descendant gene creating logic of this invention.

FIG. 6 is a diagram showing an example of self gene creating logic (for a descendant) of this invention. The example is explained by 16 bits string to simplify the explanation. The leftmost 8 bits are an ID which is common to an agent family. In the preferred embodiment of this invention, this ID is assigned a value which is unique on the global network. For example, the ID may be created by composing an internet URL, a port number and a serial number (assigned each time when creating an original mobile agent).

The rightmost 8 bits are a bit string which specify the generation. In this example, the original agent (originator agent) is given gene information "10101101" (coinciding with the ancestor gene). The child (the second generation) agent is give gene information "01010010" which is an inversion of the rightmost 8 bits of the original agent's gene information. Further, its child (grandchild: the third generation) agent is given gene information "01011101" by inverting the rightmost 4 bits of the child's gene information. The fourth generation agent is given "01011110" by inverting the rightmost 2 bits of the third generation (grandchild) agent's gene information, and the fifth generation agent is given "01011111" by inverting the rightmost 1 bit of the fourth generation agent's gene information.

In this example, up to the fifth generation can be managed. However, it is enough for the gene information to be information which allows determination of the level of generation from the ancestor and whether or not the agent is a descendant of that ancestor. The gene information may also be information which encrypts the ancestor gene information and the generation information (or only the ancestor gene information) by a predetermined algorithm.

F. Comparison of Gene Information

Figure 7:
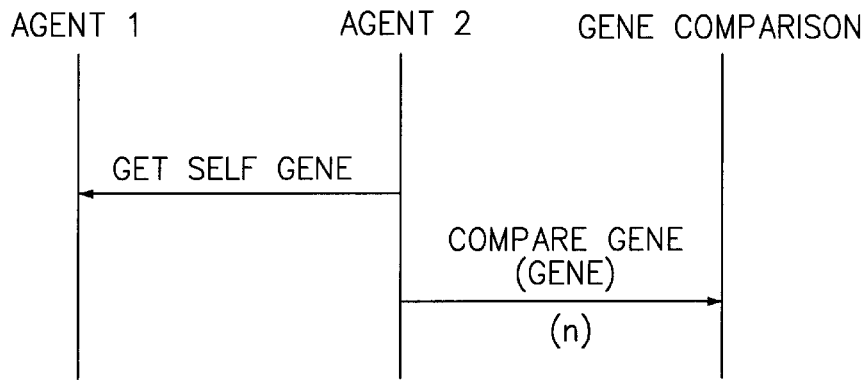
FIG. 7 is a diagram showing a message flow between objects in the preferred embodiment of this invention.

FIG. 7 is a diagram showing a major message flow of classes upon comparing genes in the preferred embodiment of this invention. The agent 200 requests another agent at the same place to deliver its self gene (get selfGene). The self gene thus obtained is stored as a gene 205 to be compared. In the preferred embodiment of this invention, the agent family ID is first identified. The gene 205 to be compared is then delivered to the gene comparison class 320 to determine the generation.

The gene comparison module 215 reverse converts the gene to compare it with the ancestor gene. If the comparison is equal in the Nth comparison, it is identified as a Nth generation descendant from the ancestor. In the preferred embodiment of this invention, when it is identified as an ancestor, the gene comparison class 320 returns N. Alternatively, the gene comparison class returns error information such as a low value when the comparison fails to match the ancestor in a predetermined number of conversions (i.e., when it is determined that the agent is not a descendant).

Figure 8:
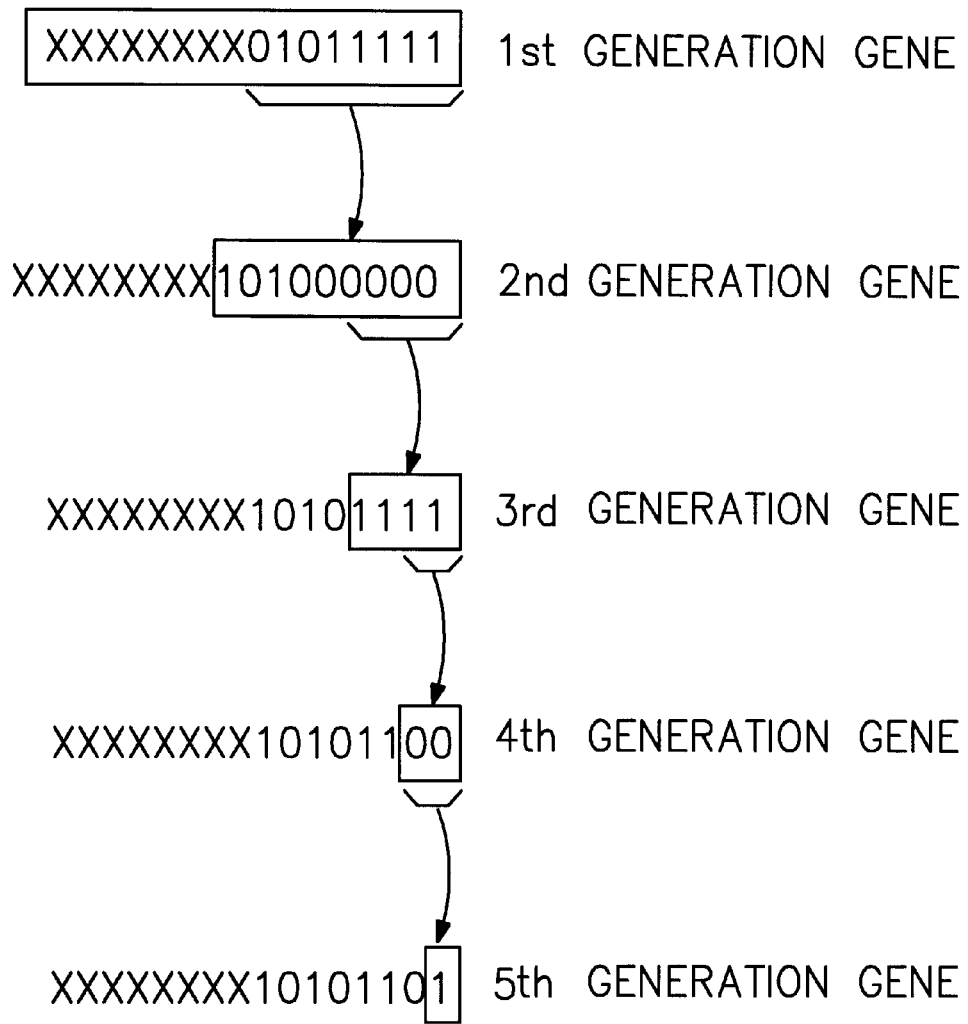
FIG. 8 is a diagram explaining an example of a gene comparison logic of this invention.

FIG. 8 is a diagram explaining an example of a reverse conversion logic for gene information in accordance with this invention. The gene of the fifth generation described in FIG. 5 is used. In this conversion, the gene is inverted in the sequence of the rightmost 8 bits, 4 bits, 2 bits and 1 bit, in the manner similar to FIG. 6, and is compared to the ancestor gene 201 each time it is converted. As shown in the figure, it is determined that the gene matches the ancestor gene 201 in the fourth conversion. In other words, it can be determined that the mobile agent has a common ancestor and that the agent is a certain number of generations that the agent removed from the ancestor.

Similarly, the second generation matches the ancestor gene 201 in the first conversion ("01010010"→"10101101"), the third generation matches in the second conversion ("01011101"→"10100010"→"10101101"), and the fourth generation matches in the third conversion ("01011110"→"10100001"→"10101110"=>"10101101").

As described in the above, this invention allows a mobile agent to identify its ancestor, children, grandchildren and sibling, etc., and to flexibly cooperate with them in working by implanting gene information in a mobile agent while maintaining a high security.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A mobile agent adapted to communicate with at least one other mobile agent comprising:
   (a) self gene information from which ancestor gene information and generation information can be derived by a predetermined conversion logic;
   (b) a gene conversion module for applying a predetermined conversion logic to derive ancestor gene information and generation information from said self gene information and from gene information obtained from said at least one other agent;
   (c) a gene comparison module for comparing the result of the conversion of the gene information obtained from said at least one other agent to said ancestor gene information derived from said self gene information; and
   (d) a child agent generating module for generating child agent gene information from said self gene information, said child agent gene information comprising information from which said ancestor information and said generation information can be derived, and for implanting said child agent gene information when creating at least one child agent of said mobile agent.

2. An object held by a mobile agent adapted to communicate with at least one other mobile agent comprising:
   (a) self gene information from which ancestor gene information and generation information can be derived by a predetermined conversion logic;
   (b) a gene conversion module for applying a predetermined conversion logic to derive ancestor gene information and generation information from said self gene information and from gene information obtained from said at least one other agent;
   (c) a gene comparison module for comparing the result of the conversion of the gene information obtained from said at least one other agent to said ancestor gene information derived from said self gene information; and
   (d) a child agent generating module for generating child agent gene information from said self gene information, said child agent gene information comprising information from which said ancestor information and said generation information can be derived, and for implanting said child agent gene information when creating at least one child agent of said mobile agent.

3. A method for a mobile agent having self gene information and ancestor gene information to create a child agent based on said mobile agent, the method comprising the steps of:
   (a) deriving generation information of said mobile agent based on self gene information and ancestor gene information;
   (b) generating child agent self gene information based on said derived generation information; and
   (c) creating a child agent having said child agent self gene information,
   wherein said generating child agent self gene information comprises the steps of: obtaining said self gene information; determining from said self gene information a generation value for said mobile agent; incrementing said generation value by one to create a child generation value; and providing said child generation value and said ancestor gene information as child agent self gene information.

4. A method of allowing a mobile agent to identify at least one other mobile agent, the method comprising the steps of:
   (a) obtaining gene information from said at least one other mobile agent to be identified;
   (b) converting said obtained gene information by a predetermined conversion logic;
   (c) comparing the result of said converting to ancestor information held in said mobile agent; and
   (d) identifying said at least one other mobile agent when the result of said converting corresponds to said ancestor gene information held in said mobile agent.

5. The method of claim 4 wherein said converting comprises deriving ancestor gene information from said gene information.

6. A program storage device readable by machine, tangibly embodying a program of instructions executable by the machine to perform method steps for allowing a mobile agent to identify at least one other mobile agent, the method comprising the steps of:

(a) obtaining gene information from said at least one other mobile agent to be identified;

(b) converting said obtained gene information by a predetermined conversion logic;

c) comparing the result of said converting to ancestor information held in said mobile agent; and d) identifying said at least one other mobile agent when the result of said converting corresponds to said ancestor gene information held in said mobile agent.

7. A program storage device readable by machine, tangibly embodying a program of instructions executable by the machine to perform method steps for a mobile agent having self gene information and ancestor gene information to create a child agent based on said mobile agent, the method comprising the steps of:

(a) deriving generation information of said mobile agent based on self gene information and ancestor gene information;

(b) generating child agent self gene information based on said derived generation information; and (c) creating a child agent having said child agent self gene information, wherein said generating child agent self gene information comprises the steps of: obtaining said self gene information; determining from said self gene information a generation value for said mobile agent; incrementing said generation value by one to create a child generation value; and providing said child generation value and said ancestor gene information as child agent self gene information.

* * * * *